April 15, 1924.

R. L. DEZENDORF

GAS METER

Filed April 7, 1917    2 Sheets-Sheet 1

Inventor
R. L. Dezendorf
By his Attorneys
Bartlett & Brownell

April 15, 1924.
R. L. DEZENDORF
GAS METER
Filed April 7, 1917        2 Sheets-Sheet 2
1,490,095
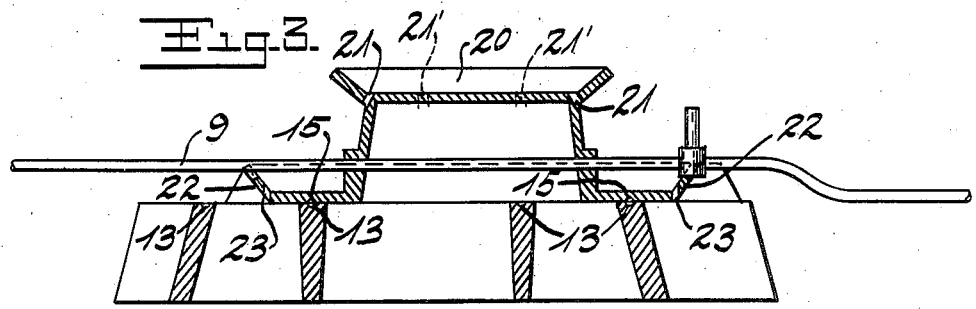
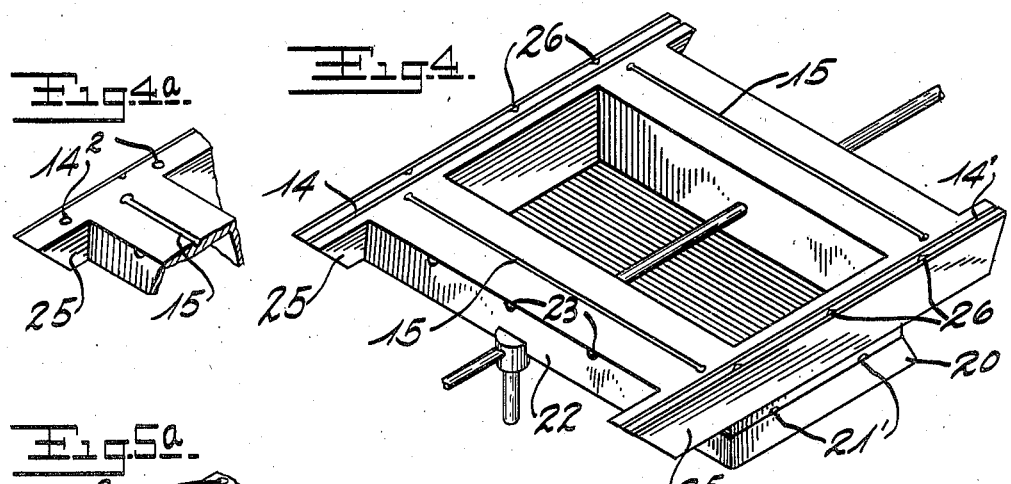
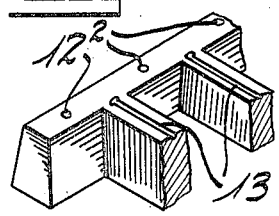
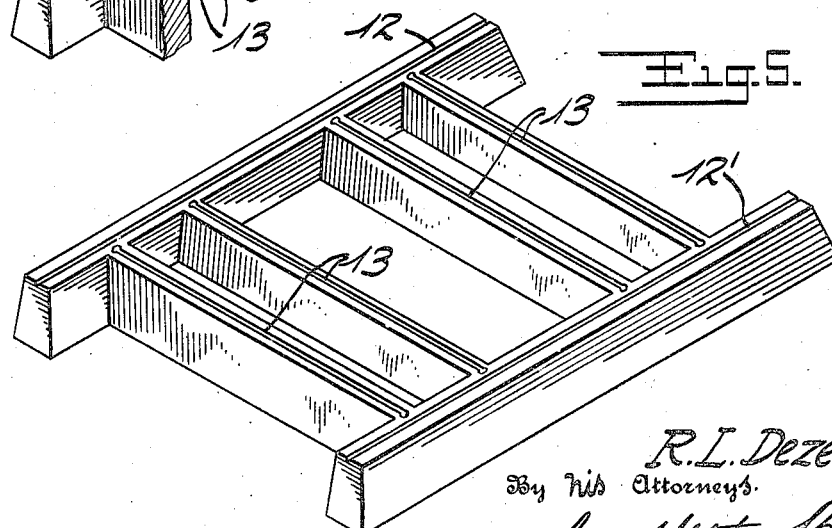
Inventor
R. L. Dezendorf
By his Attorneys.

Patented Apr. 15, 1924.

1,490,095

UNITED STATES PATENT OFFICE.

RICHARD LEE DEZENDORF, OF RICHMOND HILL, NEW YORK.

GAS METER.

Application filed April 7, 1917. Serial No. 160,374.

*To all whom it may concern:*

Be it known that I, RICHARD L. DEZENDORF, a citizen of the United States, residing at Richmond Hill, county of Queens, State of New York, have invented a certain new and useful Improvement in Gas Meters, of which the following is a full, clear, and exact description.

My invention relates to improvements in gas meters and has for its object to provide a gas meter whose valve seats and valves sliding thereon are adapted to receive and hold creeping lubricating material such as oil, vaseline and the like to keep the surfaces clean and prevent leakage, and further has for its object to provide means for supplying such lubricating material to the valve and valve seats without removing the cover of the meter casing.

The following is a description of an embodiment of my invention, reference being had to the accompanying drawings, in which:

Fig. 3 is a longitudinal section through one of the valves with its corresponding valve seat;

Fig. 4 is a perspective view of one of the valves looking toward its bottom;

Figure 1:
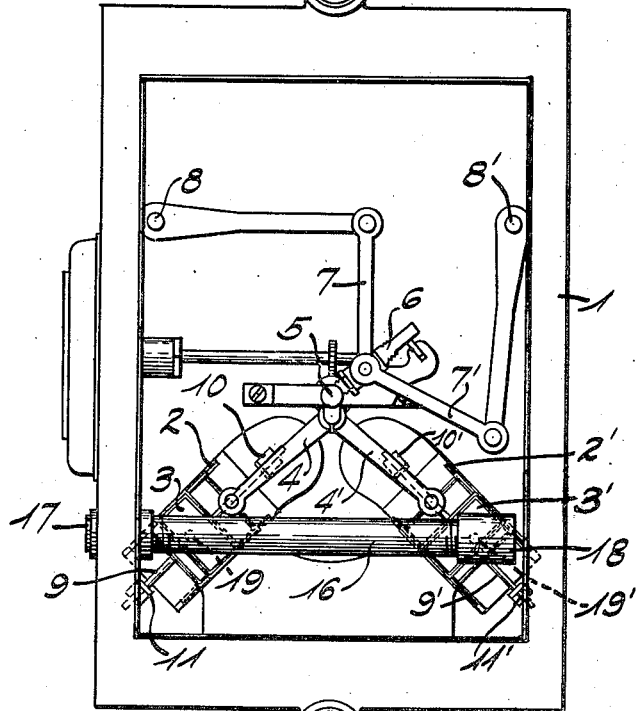
Fig. 1 shows a plan view of a meter embodying my invention, with the cover removed.
Figure 2:
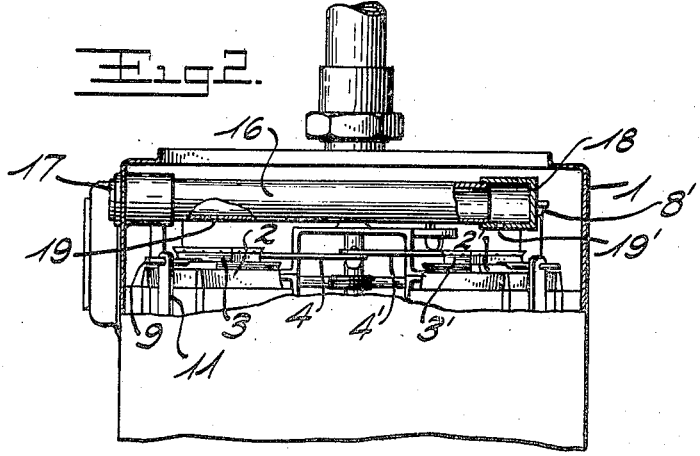
Fig. 2 is an end elevation of the same, with a portion of the casing broken away.

Fig. 4$^a$ shows a modification;

Fig. 5 is a perspective view of one of the valve seats, looking toward its top;

Fig. 5$^a$ shows a modified seat.

Referring more particularly to the drawings, 1 is a meter casing having the ordinary gallery in which are located the valve seats 2, 2′ upon which slide valves 3, 3′. These valves are connected by links 4, 4′ with the crank of the ordinary crank shaft 5, which is provided with a tangent 6, to which are connected the flag arms 7, 7′, which are in turn connected to the flag wires 8, 8′, all in the ordinary manner. The sliding valves 3, 3′ are also provided with the guide rods 9 and the guides 10 and 11 and rods 9′, guides 10′ and 11′ respectively, in the ordinary manner.

In carrying out my invention, I provide the valve seats 2, 2′ with longitudinally extending recesses or grooves 12, 12′ upon the side bars of the valve seats, and transversely extending recesses or grooves 13 upon the cross bars of the valve seats, as shown in Fig. 5.

I also provide longitudinally extending recesses or grooves 14, 14′ upon the side bars of the valve, and transversely extending recesses or grooves 15 upon the connecting portions, as shown in Fig. 4.

In order to supply oil to the valves and valve seats without removing the cover of the casing, I provide an oil duct, consisting of a rigid tube 16, the front end of which protrudes through the meter casing over the valve seats and is firmly secured thereto. The front end of this tube 16 is closed by a screw-threaded plug 17, which is provided with recesses adapted to receive a suitable spanner for removing the same or securing it in place, and is adapted to be sealed so that it cannot be tampered with. The rear end of the tube is closed as at 18. The tube 16 is provided with openings 19, 19′ in is lower side, said openings being located over the valve seats and valves so that oil introduced into the tube 16 will drip down upon the valves 3, 3′. These valves on their upper portions are provided with flanges 20 at the base of which are openings 21, 21′ which permit the oil to flow to the lower portions of the valve seat. This lower portion is also provided with a flange 22, having at its base openings 23, which permit the oil to flow downward toward the valve seat. The sides of the valves are provided with flanges 25 at the base of which are openings 26, which permit oil caught by the flanges 25 to pass downward so as to come in contact with the side members of the valve seat and lubricate the same. The openings 21′ discharge oil from within the flange 20 so that it is caught by the flange 25 and directed through the openings 26. By these means any oil placed within the flange 20 through the tube 16, or otherwise, is allowed to slowly flow down into contact with the valve seat and under surface of the sliding valves.

Any oil within the grooves of the valves and valve seats tends to spread and creep over their opposing surfaces so as to keep them lubricated for a long period.

In Figs. 4$^a$ and 5$^a$ modifications are shown, the longitudinally extending recesses in the side bars of the valves and seats being shown as shallow holes or wells 12$^2$ and 14$^2$ instead of as grooves. These wells are spaced apart a distance less than the amount of movement of the valve in either direction, so that any oil creeping out of the hole will be properly spread upon the surface.

The valve members consisting of the valve and valve seat shown in the drawing are of the ordinary gas meter type, with my improvement added. The valve seat consists of side members connected by cross-bars which form three ports, the central port being the discharge port. The side members of the valve seat extend beyond the outer cross-bars so as to support the valve at the end of each movement. The valve consists of cross-bars connected by side bars forming surfaces which extend beyond the surfaces of said cross bars. Upon the end portions of the side members of the valve seat accumulations of gummy matter are liable to be formed so as to slightly lift the valve from the valve seat, causing substantial leakage, and the principal advantage of the lubrication referred to is in the prevention of such accumulation upon the end portions of the side members and the elimination of the leakage resulting therefrom. To get this effect it is important to have longitudinally extending grooves in said side members or recesses holding lubricating material in the ends of the side members of either the valve or valve seat beyond the cross-bars, although it is preferable to have the recesses located at the ends and at other points also along the side bars of the valve seat or extending as the grooves the full lengths thereof.

In the form shown in Figs. 4 and 5, as well as in Figs. 4ª and 5ª, the side bars at points between the cross bars are provided with recesses adapted to hold a lubricant, portions of the grooves 12 and 14 being intermediate the cross bars and the cavities 12¹ and 14¹ also being out of alinement with the cross bars.

As will be evident to those skilled in the art, my invention permits of various modifications without departing from the spirit thereof or the scope of the appended claims.

What I claim is:

1. In a gas meter containing a valve and a valve seat, said valve seat having supply and discharge ports formed by side members and cross-bars, the ends of said side members extending beyond said cross-bars, the improvement which consists in lubricant holding recesses in said side and cross bars, and having the recesses in the ends of said side bars beyond the recesses in said cross-bars.

2. In a gas meter containing a valve and a valve seat, said valve seat having supply and discharge ports formed by side members and cross-bars, the ends of said side members extending beyond said cross-bars, the improvement which consists in lubricant holding recesses in said side and cross bars, and having the recesses located along said side members and in the ends thereof beyond the recesses in said cross-bars.

3. In a gas meter containing a valve and a valve seat, said valve seat having supply and discharge ports formed by side members and cross-bars, the ends of said side members extending beyond said cross-bars, the improvement which consists in lubricant holding grooves extending longitudinally along said side bars and into the ends thereof beyond said cross-bars.

4. In a gas meter containing a valve member having a lower face formed by side members and cross-bars, the ends of said side members extending beyond said cross-bars, the improvement which consists in lubricant holding recesses located in the ends of said side bars beyond said cross-bars.

RICHARD LEE DEZENDORF.